United States Patent
Savchenkov et al.

(10) Patent No.: US 9,881,208 B2
(45) Date of Patent: Jan. 30, 2018

(54) NEURAL NETWORK BASED RECOGNITION OF MATHEMATICAL EXPRESSIONS

(71) Applicant: Machine Learning Works, LLC, San Francisco, CA (US)

(72) Inventors: Pavel Savchenkov, Sochi (RU); Evgeny Savinov, Sochi (RU); Mikhail Trofimov, Sochi (RU); Sergey Kiyan, Sochi (RU); Aleksei Esin, Sochi (RU)

(73) Assignee: Machine Learning Works, LLC, San Francisco, CA (US)

( * ) Notice: Subject to any disclaimer, the term of this patent is extended or adjusted under 35 U.S.C. 154(b) by 72 days.

(21) Appl. No.: 15/187,723

(22) Filed: Jun. 20, 2016

(65) Prior Publication Data

US 2017/0364744 A1    Dec. 21, 2017

(51) Int. Cl.
| | |
|---|---|
| *G06K 9/62* | (2006.01) |
| *G06K 9/00* | (2006.01) |
| *G06K 9/32* | (2006.01) |
| *G06T 7/00* | (2017.01) |

(52) U.S. Cl.
CPC ......... *G06K 9/00409* (2013.01); *G06K 9/325* (2013.01); *G06K 9/6263* (2013.01); *G06K 9/6269* (2013.01); *G06T 7/0083* (2013.01); *G06K 2209/01* (2013.01); *G06T 2207/20081* (2013.01); *G06T 2207/20084* (2013.01)

(58) Field of Classification Search
CPC .. G06K 9/00409; G06K 2209/01; G06K 9/72; G06F 3/04883
See application file for complete search history.

(56) References Cited

U.S. PATENT DOCUMENTS

2017/0017835 A1*  1/2017  Dolfing ............... G06K 9/00979
2017/0286805 A1* 10/2017  Yu ..................... G06F 17/30247

OTHER PUBLICATIONS

Ernesto Tapia et al., "A Survey on Recognition of On-Line Handwritten Mathematical Notation", Technical Report B-07-01, Freie Universitat Berlin, Jan. 26, 2007, pp. 1-16.*

* cited by examiner

*Primary Examiner* — Brian Werner
(74) *Attorney, Agent, or Firm* — Georgiy L. Khayet

(57) ABSTRACT

Provided are methods and system for recognizing characters such as mathematical expressions or chemical formulas. An example method comprises the steps of receiving and processing an image by a pre-processing module to obtain one or more candidate regions, extracting features of each of the candidate regions by a feature extracting module such as a convolutional neural network (CNN), encoding the features into a distributive representation for each of the candidate regions separately using an encoding module such as a first long short-term memory (LSTM) based neural network, decoding the distributive representation into output representations using a decoding module such as a second LSTM-based recurrent neural network, and combining the output representations into an output expression, which is outputted in a computer-readable format or a markup language.

16 Claims, 7 Drawing Sheets

NEURAL NETWORK BASED RECOGNITION OF MATHEMATICAL EXPRESSIONS

BACKGROUND

Technical Field

This disclosure generally relates to digital image processing and optical character recognition. More particularly, this disclosure relates to methods and systems for recognition of mathematical expressions or chemical formulas using a chain of neural networks.

Description of Related Art

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

Today, many optical character recognition systems are available on the market. One particular example of optical character recognition systems includes a system for recognition of printed or hand-written mathematical symbols or expressions. Systems for recognizing mathematical characters generally include two types. The first type recognizes characters captured from a pen-based or touch-based input device and records trajectories of pen-tip or fingertip movements and extracts structure features using Hidden Markov Model or the like. The second type captures two-dimensional images by a scanner or camera and recognizes characters using Support Vector Machine based on image features. Regardless of the particular model used for optical recognition, known recognition systems employ image binarization and segmentation methods for localizing characters or symbols, as well as complex aggregation methods for assembling expressions from several recognized symbols. For this reason alone, existing recognition systems require significant computational resources, which are not available to mobile phones. Thus, recognition systems for mobile phones are operable only if the character recognition process is performed remotely on a server or in a computing cloud. Accordingly, there is a need to improve character recognition systems.

SUMMARY

This section is provided to introduce a selection of concepts in a simplified form that are further described below in the Detailed Description section. This summary is not intended to identify key features or essential features of the claimed subject matter, nor is it intended to be used as an aid in determining the scope of the claimed subject matter.

This disclosure concerns methods and system for recognizing scientific notations such as, for example, mathematical expressions or chemical formulas. According to one aspect of this disclosure, an example method comprises the steps of receiving and processing an image by a pre-processing module to obtain one or more candidate regions, extracting features of each of the candidate regions by a feature extracting module such as a convolutional neural network (CNN), encoding the features into a distributive representation for each of the candidate regions separately using an encoding module such as a first long short-term memory (LSTM) based neural network, decoding the distributive representation into output representations using a decoding module such as a second LSTM-based recurrent neural network, and combining the output representations into an output expression created in a computer-readable format or a markup language.

According to another aspect of this disclosure, an example system for character recognition includes a pre-processing module operable to receive an image and obtain one or more candidate regions from the image, a feature extracting module operable to extract features of each of the candidate regions, an encoding module operable to encode the features into a distributive representation, a decoding module operable to decode the distributive representation for each of the candidate regions into one or more output representations, and a post-processing module operable to combine the output representations into an output expression in accordance with a computer-readable format or a markup language.

According to yet another aspect of the disclosure, there is provided a non-transitory processor-readable medium, which stores processor-readable instructions. When the processor-readable instructions are executed by a processor, they cause the processor to implement the above-mentioned method for recognizing characters such as mathematical expressions. Additional objects, advantages, and novel features of the examples will be set forth in part in the description which follows, and in part will become apparent to those skilled in the art upon examination of the following description and the accompanying drawings or may be learned by production or operation of the examples. The objects and advantages of the concepts may be realized and attained by means of the methodologies, instrumentalities and combinations particularly pointed out in the appended claims.

BRIEF DESCRIPTION OF THE DRAWINGS

Embodiments are illustrated by way of example and not limitation in the figures of the accompanying drawings, in which like references indicate similar elements.

DETAILED DESCRIPTION OF EXAMPLE EMBODIMENTS

Figure 1:
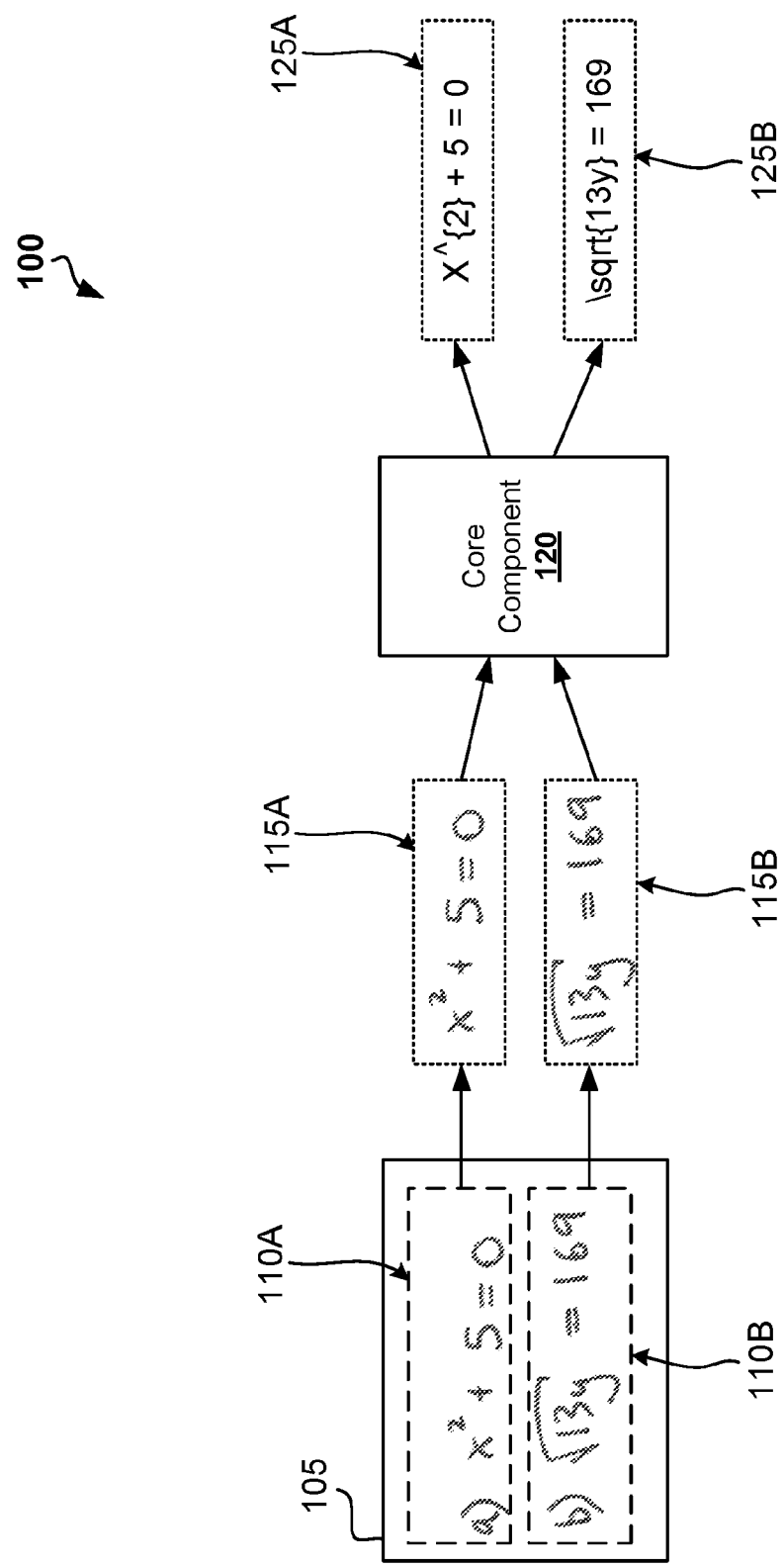
FIG. 1 shows an example general framework of character recognition.

The following detailed description of embodiments includes references to the accompanying drawings, which form a part of the detailed description. Approaches described in this section are not prior art to the claims and are not admitted to be prior art by inclusion in this section. The drawings show illustrations in accordance with example embodiments. These example embodiments, which are also referred to herein as "examples," are described in enough detail to enable those skilled in the art to practice the present subject matter. The embodiments can be combined, other embodiments can be utilized, or structural, logical and operational changes can be made without departing from the scope of what is claimed. The following detailed description is, therefore, not to be taken in a limiting sense, and the scope is defined by the appended claims and their equivalents.

This disclosure relate to methods and systems for recognizing one or more characters, both handwritten and printed, which may include mathematical expressions, equations, chemical formulas, and so forth. The embodiments provided in this disclosure solve at least some issues of known art. The present disclosure is also designed to work on mobile devices, such as smartphones, tablet computers or mobile phones, in real-time and without connection to the Internet or the need to use server-side computational resources, although the embodiments can be extended to approaches involving a web service or a cloud-based resource.

In accordance with the present disclosure, the character recognition involves acquiring and processing one or more images containing a handwritten or printed set of characters, for example, a mathematical expression. In this sense, the present disclosure provides for an "end-to-end" and "off-line" recognition of mathematical expressions. In certain embodiments, the recognition process is based on automatic extraction of image features using a sequential image processing method involving the use of a neural network such as a CNN or the like, where a window is sliding stepwise along the images from left to right (or any other direction) to create a plurality of image features. The image features can be then encoded to create a vector of distributive representation. For this purpose, another neural network can be applied such as a first recurrent neural network. The vector can be further decoded by a second recurrent neural network to generate output representations of the characters present in the original images. The output representations can be then processed to be combined into a single and final output expression of a specific computer-readable format (single or multi-lined), which can be converted to any suitable markup language such as LaTeX or MathML.

The present disclosure can be implemented using a variety of technologies. For example, methods described herein can be implemented by software running on a computer system and/or by hardware utilizing either a combination of microprocessors or other specifically designed application-specific integrated circuits (ASICs), programmable logic devices, or any combinations thereof. In particular, the methods described herein can be implemented by a series of computer-executable instructions residing on a non-transitory storage medium such as a disk drive or computer-readable medium. It should be noted that methods disclosed herein can be implemented by a computing device such as a mobile device, personal computer, server, network node, and so forth.

For purposes of this patent document, the terms "or" and "and" shall mean "and/or" unless stated otherwise or clearly intended otherwise by the context of their use. The term "a" shall mean "one or more" unless stated otherwise or where the use of "one or more" is clearly inappropriate. The terms "comprise," "comprising," "include," and "including" are interchangeable and not intended to be limiting. For example, the term "including" shall be interpreted to mean "including, but not limited to."

It should be also understood that the terms "first," "second," "third," and so forth can be used herein to describe various elements. These terms are used to distinguish one element from another, but not to imply a required sequence of elements. For example, a first element can be termed a second element, and, similarly, a second element can be termed a first element, without departing from the scope of present disclosure.

The term "image" shall mean any type of digital data, which has a two-dimensional or three-dimensional representation. An image can be created by a camera or scanner so that the image can be displayable on a display of certain electronic devices. Moreover, in certain embodiments, the term "image" can refer to a still image, a moving image (e.g., a video), or any combination thereof.

The term "character" shall mean a member of alphabetic, legographic, phonetic, or syllabic character set, which includes syllables, alphabets, numerals, and punctuation marks. The term "character" includes both a handwritten character and a printed character. The terms "character" and "symbol" can have the same meaning and be used interchangeably. In certain embodiments, the term "character" also refers to a character or symbol of a mathematical expression or chemical formula.

Moreover, in this disclosure, the term "mathematical expression" can not only be given its ordinary and plain meaning, but also refer to various scientific and engineering notations such as, for example, mathematical equations, chemical formulas, or any other sets of characters involving any scientific or engineering meaning.

The term "neural network" (NN) may refer to a network of simple processing elements (artificial neurons) which can exhibit complex global behavior, determined by the connections between the processing elements and element parameters. An example NN, in its formulation or operation, provides an adaptive system that changes its structure based on external or internal information that flows through the network. NNs are a family of machine-learning methods and can be used to implement one or more operations in the process of optical character recognition according to the embodiments of this disclosure. In this disclosure, the term "neural network" can refer to a pre-trained neural network or neural network that is to be trained.

Referring now to the drawings, exemplary embodiments are described. The drawings are schematic illustrations of idealized example embodiments. Thus, the example embodiments discussed herein should not be understood as limited to the particular illustrations presented herein, rather these example embodiments can include deviations and differ from the illustrations presented herein as shall be evident to those skilled in the art.

FIG. 1 shows a general framework 100 of character recognition in accordance with certain embodiments of this disclosure. The character recognition can commence with acquiring an image 105. In this example embodiment, the image 105 includes two handwritten mathematical expressions 110A and 110B. The image 105 can be captured by a camera of a mobile device or it can be scanned by a scanner, although other methods for image acquisition can be applied.

In some embodiments, the camera of mobile device may not provide image quality sufficient for reliable character recognition. In this scenario, the present disclosure provides for the possibility of capturing a video stream with the camera of a mobile device. The video stream is then preprocessed to perform "smart position matching" which involves retrieving a plurality of frames, recognizing one or more of the same objects in each of the frames, matching positions of the objects to combine the frames into a single image of enhanced quality. The pre-processing can also include a de-blurring operation, color adjustment operation, contrast adjustment operation, brightness adjustment operation, image cropping operation, image rotating operation, application of one or more image filters, or any other image pre-processing.

As further illustrated in FIG. 1, the input image 105 can be processed and split into one or more candidate regions, each of which can correspond to one mathematical expression. In this example, the image 105 is split into a candidate region 115A and candidate region 115B, which correspond to mathematical expressions 110A and 110B, respectively. The candidate regions 115A and 115B can be optionally pre-processed by scaling to a predetermined size (e.g., to a predetermined height) by removing noise with any suitable computer vision tools or enhancing the regions in any other suitable manner.

Figure 2:
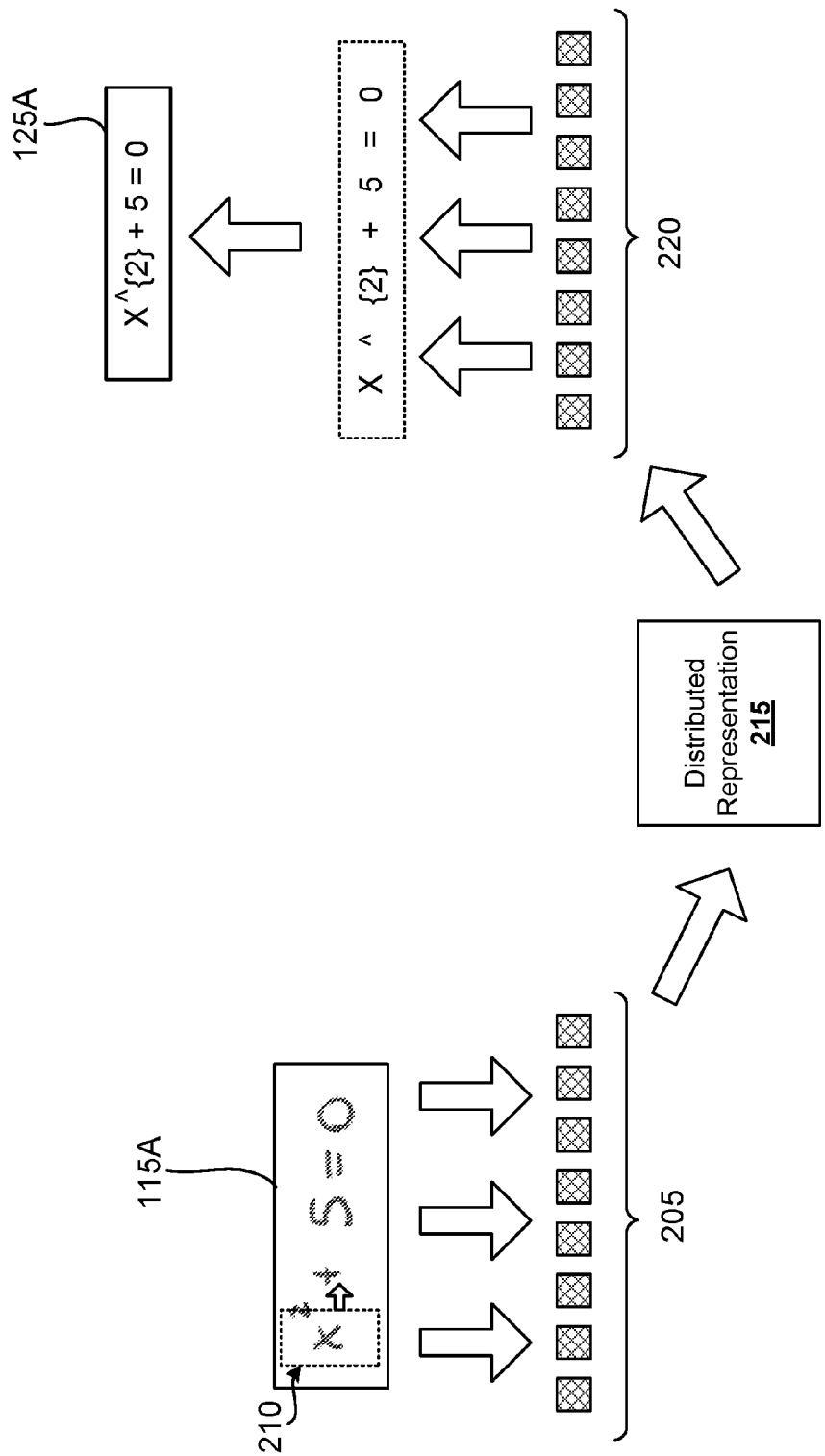
FIG. 2 shows an example high-level process of character recognition by a core component.
Figure 5:
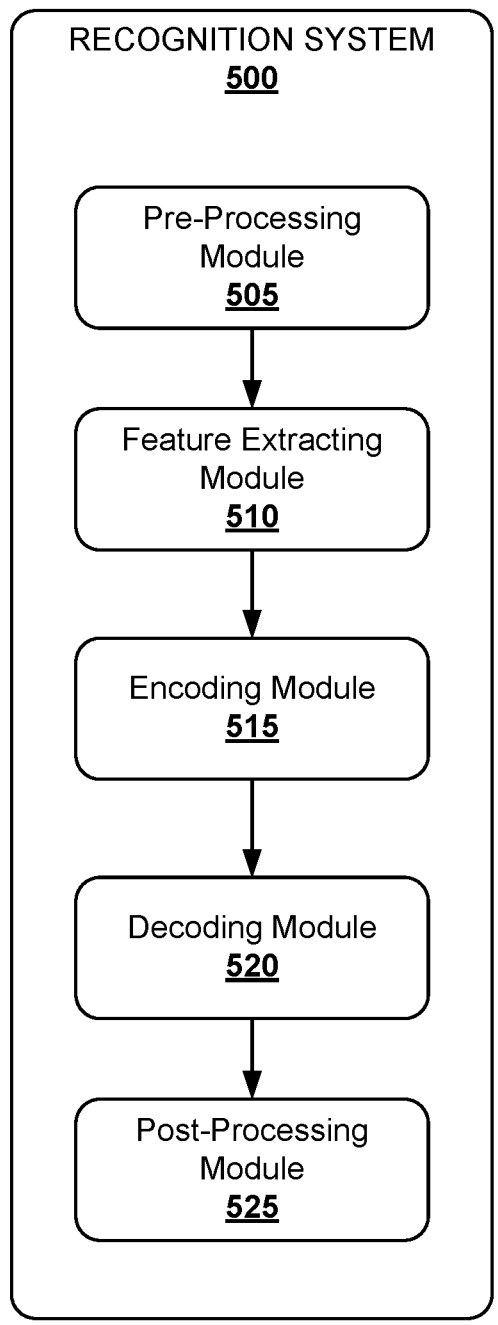
FIG. 5 shows a block diagram of a recognition system, in accordance with an example embodiment.

Furthermore, each of the candidate regions 115A and 115B is supplied to a core component 120, which can includes three modules: a feature extracting module, an encoding module, and a decoding module (see also FIG. 2 and FIG. 5). FIG. 2 shows a high-level process 200 of character recognition by the core component 120 according to some example embodiments.

Referring now to FIG. 1 and FIG. 2, the feature extracting module receives each of the candidate regions 115A and 115B as an input and extracts features 205. The feature extraction can be implemented using any applicable machine-learning algorithm such as a CNN. A CNN can include multiple layers of artificial neurons, which can learn high-level features efficiently from a large amount of classified training data. The CNN can effectively extract image features based on visual characteristics of input images. To these ends, the CNN can use a window 210 having a size of at least a part of candidate region 115A or 115B. The window 210 can be moved by the CNN along each of the candidate regions 115A and 115B in a stepwise manner from left to right (or in any other direction or both in case of bi- and more-directional recurrent neural network, such as left to right and right to left or left to right and top to bottom) in order to cover every pixel of the candidate regions 115A, 115B. In the framework 100, the CNN can be a pre-trained NN, a yet to be trained NN, or a NN with ongoing training.

Once the features 205 are extracted from the candidate regions 115A and 115B, the features 205 can be fed to the encoding module for encoding into a distributive representation 215 with respect to spatial information. The encoding can be performed using a first recurrent neural network such as a first LSTM-based recurrent neural network, which can be pre-trained to recognize sequential characters of the candidate regions 115A and 115B based on their respective features 205. In other embodiments, the first recurrent neural network can include any other pre-trained or not-trained NN including, but not limited to, a bi-directional recurrent neural network, continuous-time recurrent neural network, hierarchical recurrent neural network, and so forth.

Furthermore, the distributive representation 215 is decoded by the decoding module, which employs a second LSTM-based recurrent neural network. Notably, the second LSTM-based recurrent neural network can differ from the first LSTM-based recurrent neural network. When decoded, the decoding module creates one or more output representations 220, each of which is associated with a particular character of the initial mathematical expression 110A, 110B. The output representations 220 are then post-processed by combining into a single output expression 125A. Thus, as shown in FIG. 1, the core component creates an output expression 125A and output expression 125B, which correspond to the mathematical expressions 110A and 110B, respectively. The output expressions 125A, 125B can be in predetermined machine-readable form in order to be displayable and capable of processing by a computer device. In certain embodiments, the output expressions 125A, 125B are multi-lined.

Figure 3:
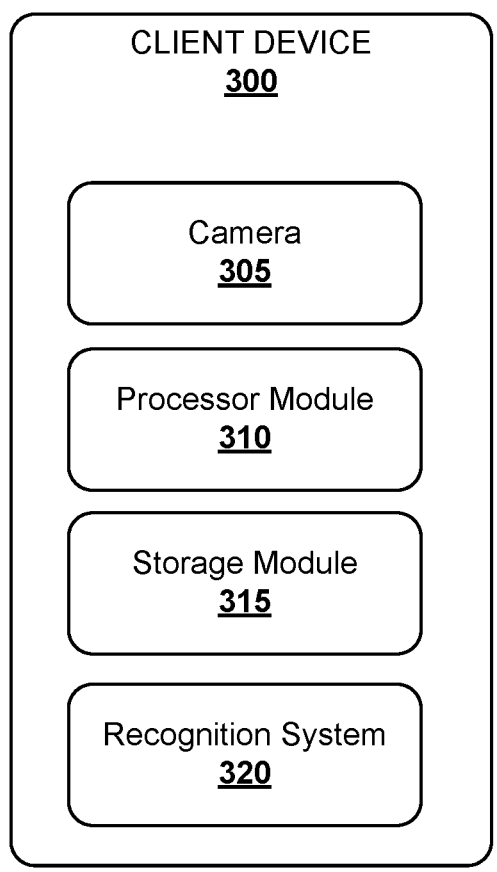
FIG. 3 shows an example embodiment of a client device for implementing methods for character recognition.

FIG. 3 shows an example embodiment of client device 300 for implementing methods for character recognition as described herein. The client device 300 can refer to a mobile device such as a mobile phone, smartphone, or tablet computer. In further embodiments, however, the client device 300 can refer to a personal computer, laptop computer, netbook, home gateway, broadband gateway, network appliance, set top box, television device, multimedia device, personal digital assistant, access gateway, network device, server device, network storage computer, game console, entertainment system, infotainment system, vehicle computer, or any other computing device.

In the example shown in FIG. 3, the client device 300 includes both hardware components and software components. Particularly, the client device 300 includes a camera 305 or any other image-capturing device or scanner to acquire digital images of mathematical expressions to be recognized and "digitized." The client device 300 can further include a processor module 310 and a storage module 315 for storing software components, processor-readable (machine-readable) instructions or codes, which when performed by the processor module 310, causes the client device 300 to perform at least some steps of methods for character recognition as described herein.

The client device 300 can further include a recognition system 320, which, in turn, can include hardware components (e.g., a separate processing module and memory), software components, or a combination thereof. The recognition system 320 can be configured to perform recognition of mathematical expressions as described herein. The recognition system 320 is described in more detail below with reference to FIG. 5.

In the embodiment of FIG. 3, the client device 300 can provide end-to-end recognition of mathematical expressions with the use of the Internet or connection to remote servers, web services, or by using a computing cloud.

Figure 4:
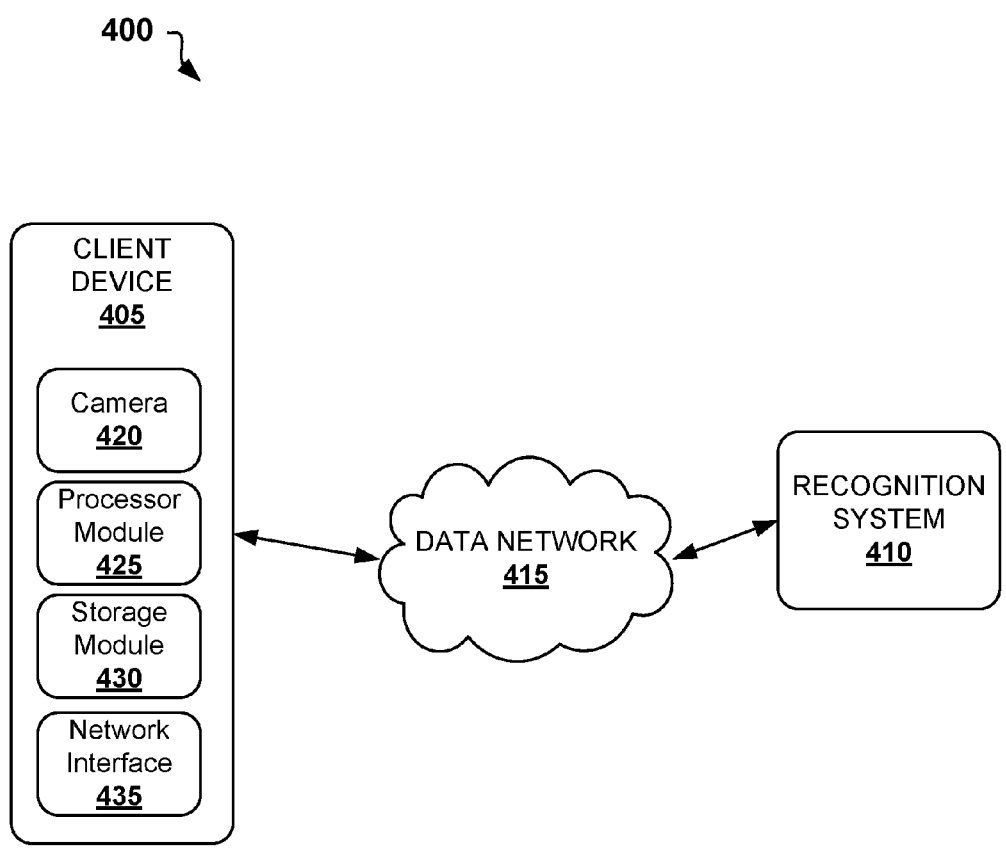
FIG. 4 shows an example computer environment for implementing methods for character recognition.

FIG. 4 shows an example computer environment 400 for implementing the methods for character recognition (e.g., recognition of characters of mathematical expressions) as described herein and according to some illustrative embodiments. The computer environment 400 includes one or more client devices 405, which are operatively connected to a recognition system 410 via one or more data networks 415.

The data network 415 can refer to any wired, wireless, or optical networks including, for example, the Internet, intranet, local area network (LAN), Personal Area Network (PAN), Wide Area Network (WAN), Virtual Private Network (VPN), cellular phone networks (e.g., Global System for Mobile (GSM) communications network, packet switching communications network, circuit switching communications network), Bluetooth radio, Ethernet network, an IEEE 802.11-based radio frequency network, a Frame Relay network, Internet Protocol (IP) communications network, or any other data communication network utilizing physical layers, link layer capability, or network layer to carry data packets, or any combinations of the above-listed data networks. In some embodiments, the data network 415 includes a corporate network, data center network, service provider network, mobile operator network, or any combinations thereof.

The communication between the elements of computer environment 400 can be based on one or more data communication sessions established and maintained using a number of protocols including, but not limited to, Internet Protocol (IP), Internet Control Message Protocol (ICMP), Simple Object Access Protocol (SOAP), Transmission Control Protocol (TCP), User Datagram Protocol (UDP), Hypertext Transfer Protocol (HTTP), Hypertext Transfer Protocol Secure (HTTPS), File Transfer Protocol (FTP), Transport Layer Security (TLS) protocol, Secure Sockets Layer (SSL) protocol, Internet Protocol Security (IPSec), Voice over IP (VoIP), secure video or audio streaming protocols, secure conferencing protocols, secure document access protocols, secure network access protocols, secure e-commerce protocols, secure business-to-business transaction protocols, secure financial transaction protocols, secure collaboration protocols, secure on-line game session protocols, and so forth.

The client device 405 can refer to a mobile device, smartphone, tablet computer, personal computer, and the like. The client device 405 should include at least a processor module 425, a data storage module 430, and a network interface 435. The client devices 120 can be operated by a user, for example, to take an image of mathematical expressions with a camera 420 and transmit the same to the recognition system 410 via the data network 415 with or without image pre-processing. The recognition system 410 can perform character recognition using the methods described herein and return one or more output expressions (such as output expressions 125A, 125B) to the client device 405 or any other device such as a server, web service, data storage, network node, and the like. The recognition system 410 is described in more detail below with reference to FIG. 5.

FIG. 5 shows a block diagram of recognition system 500 according to one example embodiment. The recognition system 500 can be implemented as an instance of recognition system 320 or 410. As shown in FIG. 5, the recognition system 500 can include a pre-processing module 505, a feature extracting module 510, an encoding module 515, a decoding module 520, and a post-processing module 525. The modules 505-525 can be operatively connected to each other using one or more communication buses, input-output buses, data networks, or any other communication means, or any combinations thereof. It should be also understood that each of the modules 505-525 can include hardware components (e.g., one or more processors, memory, network interface, etc.), software components (e.g., one or more software or middleware applications, computer-readable code, or computer-readable instructions), or any combinations thereof. Thus, in some embodiments, each or any of the modules 505-525 can be implemented as stand-alone hardware devices. Similarly, in other embodiments, each or any of the modules 505-525 can be implemented as software components for use with hardware devices such as a computing device, client device, server, and the like.

The pre-processing module 505 can be configured to receive an image from a camera, scanner, or any other electronic device and optionally perform one or more pre-processing algorithms. In some examples, the pre-processing module 505 splits the input image to obtain one or more candidate regions from the image. The pre-processing module 505 can also scale the candidate regions to a predetermined size (e.g., a predetermined height) and remove noise (e.g., boundary noise) from the one or more candidate regions. The pre-processing module 505 can also perform other image enhancements, for example, it can change colors, brightness, contrast, sharpness, image orientation, and so forth. In some embodiments, the pre-processing module 505 can optionally change a file format of the image.

In further embodiments, pre-processing module 505 can be configured to receive two or more frames of a video stream, recognize at least one object in each of the frames by the pre-processing module, match positions of the at least one object in each of the frames, and combine the frames into the image. This process can provide input images of enhanced quality sufficient for further character recognition.

The feature extracting module 510 is operatively connected to the pre-processing module 505. The feature extracting module 510 can be configured to extract features of each of the candidate regions. To these ends, the feature extracting module 510 can apply a CNN, which, in turn, can employ a virtual window. The feature extracting module 510 can slide the window along the each of the candidate regions in a step-by-step manner such that the features are obtained from a plurality of positions of the window. It should be also mentioned that the CNN can be pre-trained or not pre-trained. In some embodiments, the feature extracting module 510 can generate or receive feedback (e.g., a user-generated feedback) with regard to the quality of feature extraction. In this scenario, the feedback can be used to train the CNN.

The encoding module 515 can be operatively connected to the feature extracting module 510. In certain embodiments, the encoding module 515 can be configured to encode the features into a distributive representation for each of the candidate regions separately. To these ends, the encoding module 515 can apply a first recurrent neural network such as a first LSTM-based recurrent neural network. In some embodiments, the first recurrent neural network can be pre-trained. In other embodiments, the first recurrent neural network is not trained or not sufficiently trained. In this scenario, the encoding module 515 can generate or receive feedback (e.g., a user-generated feedback) with regard to the quality of feature encoding. The feedback can be used to train the first recurrent neural network.

The decoding module 520 can be operatively connected to the encoding module 515. In certain embodiments, the decoding module 520 is configured to decode the distributive representation for each of the candidate regions into one or more output representations. The decoding of the distributive representation can involve applying a second recurrent neural network such as a second LSTM-based recurrent neural network. In some embodiments, the second recurrent neural network can be pre-trained. In other embodiments, the second recurrent neural network is not trained or not sufficiently trained. In this scenario, the decoding module 520 can generate or receive feedback (e.g., a user-generated feedback) with regard to the quality of feature decoding. The feedback can be used to train the second recurrent neural network.

The post-processing module 525 can be connected to the decoding module 520. In some embodiments, the post-processing 525 is operable to combine the one or more output representations into an output expression of a predetermined computer-readable format.

Figure 6:
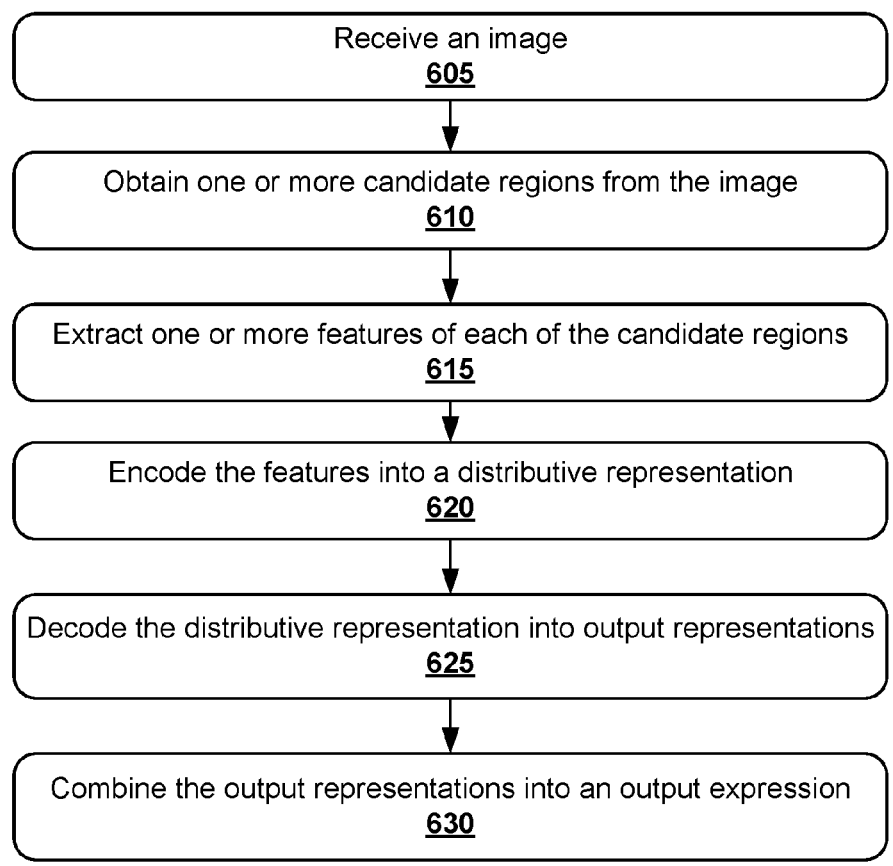
FIG. 6 shows a process flow diagram of a method for recognizing of mathematical expressions, in accordance with an example embodiment.

FIG. 6 is a process flow diagram showing a method 600 for recognizing of mathematical expressions according to an example embodiment. The method 600 can be performed by processing logic that can comprise hardware (e.g., decision-making logic, dedicated logic, programmable logic, application-specific integrated circuit (ASIC), and microcode), software (such as software run on a general-purpose computer system or a dedicated machine), or a combination of both. In one example embodiment, the processing logic refers to modules of recognition system 500. Notably, below recited steps of the method 600 can be implemented in an order different than described and shown in the FIG. 6. Moreover, the method 600 may have additional steps not shown herein, but which can be evident to those skilled in the art from the present disclosure. The method 600 may also have fewer steps than outlined below and shown in FIG. 6.

The method 600 can commence at step 605 with the pre-processing module 505 receiving an image. In step 610, the pre-processing module 505 obtains one or more candidate regions from the received image. In step 615, the feature extracting module 510 extracts one or more features of each of the candidate regions (e.g., using a CNN). In step 620, the encoding module 515 encodes the features into a distributive representation for each of the candidate regions separately using a first LSTM-based recurrent neural network or the like. In step 625, the decoding module 520 decodes the distributive representation for each of the candidate regions into one or more output representations using a second LSTM-based recurrent neural network or the like. In step 630, the post-processing module 525 can combine the one or more output representations into an output expression 125 of a predetermined computer-readable format (e.g., in a markup language).

Figure 7:
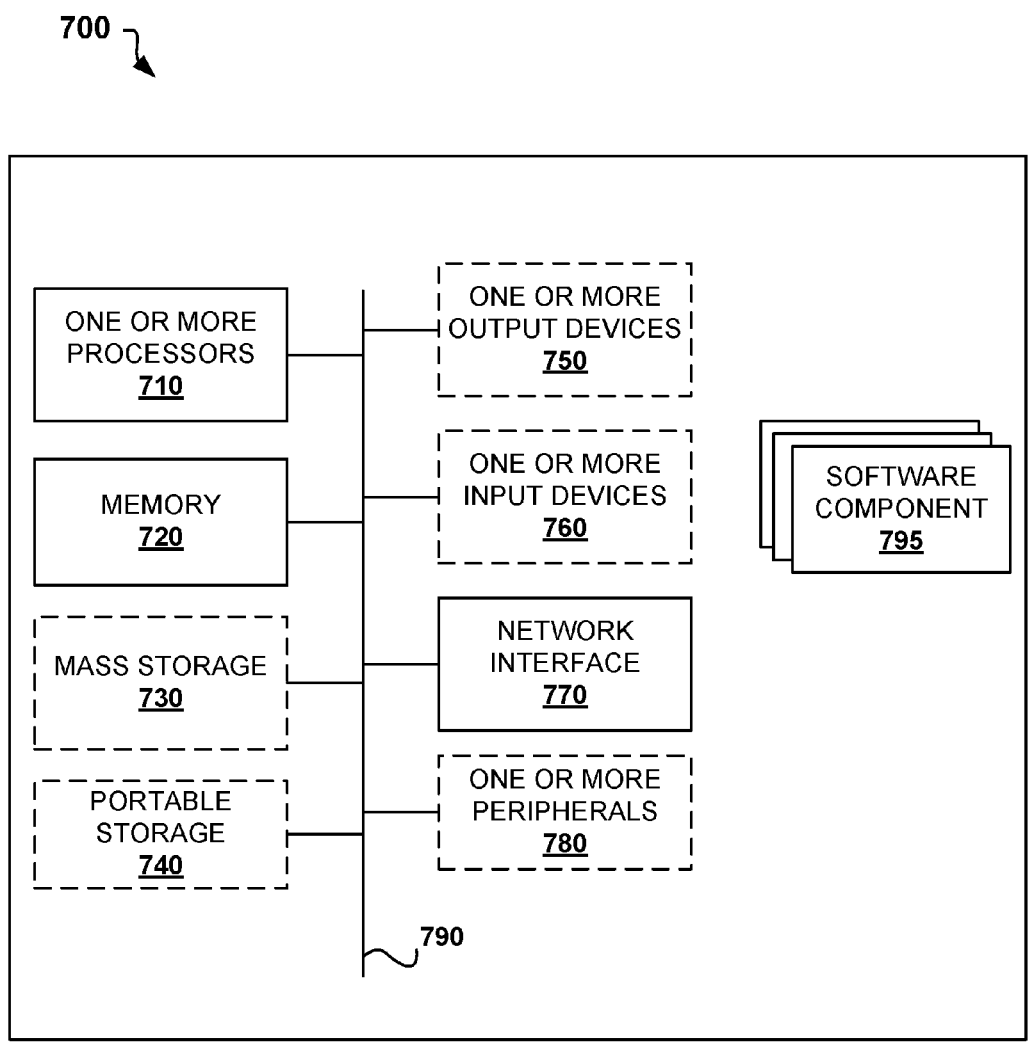
FIG. 7 shows an example computer system that can be used to implement the methods for recognizing of mathematical expressions.

FIG. 7 illustrates an example computing system 700 that may be used to implement methods described herein. The computing system 700 may be implemented in the contexts of the likes of client device 300, client device 405, recognition system 500, pre-processing module 505, feature extracting module 510, encoding module 515, decoding module 520, and post-processing module 525.

As shown in FIG. 7, the hardware components of the computing system 700 may include one or more processors 710 and memory 720. Memory 720 stores, in part, instructions and data for execution by processor 710. Memory 720 can store the executable code when the system 700 is in operation. The system 700 may further include an optional mass storage device 730, optional portable storage medium drive(s) 740, one or more optional output devices 750, one or more optional input devices 760, an optional network interface 770, and one or more optional peripheral devices 780. The computing system 700 can also include one or more software components 795 (e.g., ones that can implement the methods for character recognition as described herein).

The components shown in FIG. 7 are depicted as being connected via a single bus 790. The components may be connected through one or more data transport means or data network. The processor 710 and memory 720 may be connected via a local microprocessor bus, and the mass storage device 730, peripheral device(s) 780, portable storage device 740, and network interface 770 may be connected via one or more input/output (I/O) buses.

The mass storage device 730, which may be implemented with a magnetic disk drive, solid-state disk drive, or an optical disk drive, is a non-volatile storage device for storing data and instructions for use by the processor 710. Mass storage device 730 can store the system software (e.g., software components 795) for implementing embodiments described herein.

Portable storage medium drive(s) 740 operates in conjunction with a portable non-volatile storage medium, such as a compact disk (CD), or digital video disc (DVD), to input and output data and code to and from the computing system 700. The system software (e.g., software components 795) for implementing embodiments described herein may be stored on such a portable medium and input to the computing system 700 via the portable storage medium drive(s) 740.

The optional input devices 760 provide a portion of a user interface. The input devices 760 may include an alphanumeric keypad, such as a keyboard, for inputting alphanumeric and other information, or a pointing device, such as a mouse, a trackball, a stylus, or cursor direction keys. The input devices 760 can also include a camera or scanner. Additionally, the system 700 as shown in FIG. 7 includes optional output devices 750. Suitable output devices include speakers, printers, network interfaces, and monitors.

The network interface 770 can be utilized to communicate with external devices, external computing devices, servers, and networked systems via one or more communications networks such as one or more wired, wireless, or optical networks including, for example, the Internet, intranet, LAN, WAN, cellular phone networks, Bluetooth radio, and an IEEE 802.11-based radio frequency network, among others. The network interface 770 may be a network interface card, such as an Ethernet card, optical transceiver, radio frequency transceiver, or any other type of device that can send and receive information. The optional peripherals 780 may include any type of computer support device to add additional functionality to the computer system.

The components contained in the computing system 700 are intended to represent a broad category of computer components. Thus, the computing system 700 can be a server, personal computer, hand-held computing device, telephone, mobile computing device, workstation, minicomputer, mainframe computer, network node, or any other computing device. The computing system 700 can also include different bus configurations, networked platforms, multi-processor platforms, and so forth. Various operating systems (OS) can be used including UNIX, Linux, Windows, Macintosh OS, Palm OS, and other suitable operating systems.

Some of the above-described functions may be composed of instructions that are stored on storage media (e.g., computer-readable medium or processor-readable medium). The instructions may be retrieved and executed by the processor. Some examples of storage media are memory devices, tapes, disks, and the like. The instructions are operational when executed by the processor to direct the processor to operate in accord with the invention. Those skilled in the art are familiar with instructions, processor(s), and storage media.

It is noteworthy that any hardware platform suitable for performing the processing described herein is suitable for use with the invention. The terms "computer-readable storage medium" and "computer-readable storage media" as used herein refer to any medium or media that participate in providing instructions to a processor for execution. Such media can take many forms, including, but not limited to, non-volatile media, volatile media, and transmission media. Non-volatile media include, for example, optical or magnetic disks, such as a fixed disk. Volatile media include dynamic memory, such as system random access memory (RAM). Transmission media include coaxial cables, copper wire, and fiber optics, among others, including the wires that include one embodiment of a bus. Transmission media can also take the form of acoustic or light waves, such as those generated during radio frequency (RF) and infrared (IR) data communications. Common forms of computer-readable media include, for example, a floppy disk, a flexible disk, a hard disk, magnetic tape, any other magnetic medium, a CD-read-only memory (ROM) disk, DVD, any other optical medium, any other physical medium with patterns of marks or holes, a RAM, a PROM, an EPROM, an EEPROM, any other memory chip or cartridge, a carrier wave, or any other medium from which a computer can read.

Various forms of computer-readable media may be involved in carrying one or more sequences of one or more instructions to a processor for execution. A bus carries the data to system RAM, from which a processor retrieves and executes the instructions. The instructions received by system processor can optionally be stored on a fixed disk either before or after execution by a processor.

Thus, the methods and systems for recognizing characters, such as mathematical expressions, have been described. Although embodiments have been described with reference to specific example embodiments, it will be evident that various modifications and changes can be made to these example embodiments without departing from the broader spirit and scope of the present application. Accordingly, the specification and drawings are to be regarded in an illustrative rather than a restrictive sense.

What is claimed is:

1. A system for recognizing mathematical expressions, the system comprising:
    a pre-processing module operable to receive an image and obtain one or more candidate regions from the image;
    a feature extracting module operatively connected to the preprocessing module, the feature extracting module being operable to extract features of each of the candidate regions by applying a convolutional neural network (CNN), wherein the extracting of the features from each of the candidate regions includes sliding a window along each of the candidate regions such that the features are obtained from a plurality of positions of the window;
    an encoding module operatively connected to the feature extracting module, the encoding module being operable to encode the features into a distributive representation for each of the candidate regions separately;
    a decoding module operatively connected to the encoding module, the decoding module being operable to decode the distributive representation for each of the candidate regions into one or more output representations; and
    a post-processing module connected to the decoding module, the post-processing module being operable to combine the one or more output representations into an output expression in a computer-readable format.

2. The system of claim 1, wherein the pre-processing module is further operable to scale the one or more candidate regions to a predetermined size.

3. The system of claim 1, the pre-processing module being further operable to remove noise from the one or more candidate regions.

4. The method of claim 1, wherein the encoding module is operable to encode the features into the distributive representation by applying a first recurrent neural network.

5. The system of claim 4, wherein the decoding module is operable to decode the distributive representation for each of the candidate regions into the one or more output representations by applying a second recurrent neural network.

6. The system of claim 5, wherein the first recurrent neural network includes a first long short-term memory (LSTM) based recurrent neural network and the second recurrent neural network including a second LSTM-based recurrent neural network, wherein the first LSTM-based recurrent neural network differs from the second LSTM-based recurrent neural network.

7. The system of claim 1, wherein each of the output representations refers to a character or a symbol, and wherein the output expression refers to a mathematical expression or a chemical formula provided in a markup language.

8. A method for recognizing mathematical expressions, the method comprising:
    receiving an image by a pre-processing module;
    obtaining one or more candidate regions from the image by the pre-processing module;
    extracting features of each of the candidate regions by a feature extracting module includes applying a CNN, wherein the extracting of the features from each of the candidate regions includes sliding a window along each of the candidate regions such that the features are obtained from a plurality of positions of the window;
    encoding, by an encoding module, the features into a distributive representation for each of the candidate regions separately;
    decoding the distributive representation for each of the candidate regions into one or snore output representations by a decoding module; and
    combining, a post-processing module, the one or more output representations into an output expression being in a computer-readable format.

9. The method of claim 8, further comprising:
    scaling the one or more candidate regions to a predetermined size by the pre-processing module.

10. The method of claim 8, further comprising:
    removing noise from the one or more candidate regions by the preprocessing module.

11. The method of claim 8, wherein the encoding of the features into the distributive representation includes applying a first recurrent neural network by the encoding module.

12. The method of claim 11, wherein the decoding of the distributive representation for each of the candidate regions into the one or more output representations includes applying a second recurrent neural network by the decoding module.

13. The method of claim 12, wherein the first recurrent neural network includes a first LSTM-based recurrent neural network and the second recurrent neural network includes a second LSTM-based recurrent neural network, wherein the first LSTM-based recurrent neural network differs from the second LSTM-based recurrent neural network.

14. The method of claim 8, wherein each of the output representations refers to a character or a symbol, and wherein the output expression refers to a mathematical expression or a chemical formula provided in a markup language.

15. The method of claim 8, further comprising:
    receiving, by the pre-processing module, two or more frames of a video stream;
    recognizing at least one object in each of the frames by the preprocessing module;
    matching positions of the at least one object in each of the frames by the pre-processing module; and
    combining the frames into the image by the pre-processing module.

16. A non-transitory processor-readable medium having instructions stored thereon, which when executed by one or more processors, cause the one or more processors to implement a method for recognizing mathematical expressions, the method comprising:
    receiving an image by a pre-processing module;
    obtaining one or more candidate regions from the image by the pre-processing module;
    extracting features of each of the candidate regions by a feature extracting module includes applying a CNN, wherein the extracting of the features from each of the candidate regions includes sliding a window along each of the candidate regions such that the features are obtained from a plurality of positions of the window;

encoding, by an encoding module, the features into a distributive representation for each of the candidate regions separately;

decoding the distributive representation for each of the candidate regions into one or more output representations by a decoding module; and combining, a post-processing module, the one or more output representations into an output expression being in a computer-readable format.

\* \* \* \* \*